(12) United States Patent
Massey

(10) Patent No.: US 7,243,120 B2
(45) Date of Patent: Jul. 10, 2007

(54) TRANSACTION-BASED ENTERPRISE APPLICATION INTEGRATION (EAI) AND DEVELOPMENT SYSTEM

(75) Inventor: Stuart E. Massey, Columbia, SC (US)

(73) Assignee: Integrated Business Systems and Services, Inc., Columbia, SC (US)

( * ) Notice: Subject to any disclaimer, the term of this patent is extended or adjusted under 35 U.S.C. 154(b) by 940 days.

(21) Appl. No.: 09/940,179

(22) Filed: Aug. 27, 2001

(65) Prior Publication Data

US 2002/0111820 A1    Aug. 15, 2002

Related U.S. Application Data

(60) Provisional application No. 60/228,219, filed on Aug. 25, 2000.

(51) Int. Cl.
*G06F 15/16*    (2006.01)
*G06F 7/00*    (2006.01)

(52) U.S. Cl. .............. 709/200; 709/201; 709/217; 709/230; 707/100; 707/101; 707/102

(58) Field of Classification Search ........ 709/200–201, 709/217, 230; 707/100–102
See application file for complete search history.

(56) References Cited

U.S. PATENT DOCUMENTS

| | | | |
|---|---|---|---|
| 5,329,619 A * | 7/1994 | Page et al. .................. 709/203 |
| 5,561,797 A | 10/1996 | Gilles et al. | |
| 5,706,516 A * | 1/1998 | Chang et al. ............... 719/314 |
| 5,721,909 A | 2/1998 | Oulid-Aissa et al. | |
| 5,754,772 A | 5/1998 | Leaf | |
| 5,832,484 A * | 11/1998 | Sankaran et al. ............. 707/8 |
| 5,913,061 A | 6/1999 | Gupta et al. | |
| 5,916,307 A | 6/1999 | Piskiel et al. | |
| 5,924,097 A | 7/1999 | Hill et al. | |
| 6,039,245 A | 3/2000 | Symonds et al. | |
| 6,108,649 A * | 8/2000 | Young et al. .................. 707/4 |
| 6,606,660 B1 * | 8/2003 | Bowman-Amuah ......... 709/227 |
| 6,681,228 B2 * | 1/2004 | Balogh ........................ 707/10 |
| 2003/0009543 A1 * | 1/2003 | Gupta ......................... 709/223 |
| 2003/0051236 A1 * | 3/2003 | Pace et al. .................. 717/177 |
| 2004/0249814 A1 * | 12/2004 | Navarre et al. ................ 707/9 |

OTHER PUBLICATIONS

PCT International Search Report dated Oct. 5, 2001, from then-copending PCT application.
Article entitled "Make the Connection," www.manufacturingsystems.com/supplychain, Mar. 2000, pp. 76-86.

* cited by examiner

*Primary Examiner*—Nathan Flynn
*Assistant Examiner*—Joshua Joo
(74) *Attorney, Agent, or Firm*—Nelson Mullins Riley & Scarborough LLP

(57) ABSTRACT

An architecture for a computing environment wherein transactions preferably model the enterprise and its business processes directly, allowing third-party systems, like ERP, supply chain and Web portals, to be more loosely coupled. Because the system will often be distributed throughout the enterprise, reliance on central critical servers is reduced. The system of the present invention can also fill-in gaps in the functionality of legacy systems, as well as invoke complex applications and direct automated systems. The system offers an architecture where users can model their particular enterprises in business terms so that disparate applications can be linked without custom programming.

7 Claims, 5 Drawing Sheets

TRANSACTION-BASED ENTERPRISE APPLICATION INTEGRATION (EAI) AND DEVELOPMENT SYSTEM

This application claims the benefit of now abandoned provisional application Ser. No. 60/228,219, filed Aug. 25, 2000, which is relied on herein and incorporated herein by reference.

BACKGROUND OF THE INVENTION

The present invention relates to message processing in a network of interconnected computers and other electronic devices. More particularly, the present invention relates to a system for moving messages among the interconnected computers based on the transactions to be performed.

It is often necessary in various commercial enterprises to route messages among interconnected computers. For example, an enterprise resources planning (ERP) system installed in a production facility may need to communicate with computers used to control production equipment on the plant floor. Frequently, however, these various computers will have disparate operating systems and communication protocols.

One common approach to allow communication between disparate computers in a common enterprise utilizes a centralized, content-based routing software engine. Content-based routing uses the content of a particular piece of information to determine where it needs to be sent. A series of pre-programmed adapters may be provided by the software vendor to help integrate the routing engine to various environments.

It is not unusual for a content-based routing engine to require a large amount of custom programming in order to operate in a particular situation. For example, significant custom programming will be required if the individual implementations of the environment have been significantly customized beyond that which the adapters are programmed to expect. Moreover, an extensive amount of programming may be required for implementation and maintenance in an environment of constantly changing interfaces and application logic found in the world of manufacturing plant automation and B2B trading partners.

SUMMARY OF THE INVENTION

The present invention recognizes and addresses the foregoing disadvantages, and others, of prior art constructions and methods. Accordingly, it is an object of the present invention to provide an improved system for moving messages among interconnected computers.

It is a further object of the present invention to provide an improved system for moving messages among interconnected computers that substantially reduces or eliminates the need for custom programming.

It is a further object of the present invention to provide a system for moving messages among interconnected computers in a network based on the transactions to be performed.

Unlike the prior art, the architecture of the present invention is not based upon a central server that simply maps data and routes messages between existing applications. Instead, transactions of the present invention model the enterprise and its business processes directly, allowing third-party systems, like ERP, supply chain and Web portals, to be more loosely coupled. Because the system will often be distributed throughout the enterprise, reliance on central critical servers is reduced.

In addition, the system of the present invention can fill-in gaps in the functionality of legacy systems, as well as invoke complex applications and direct automated systems. The system offers an environment where users can model their particular enterprises in business terms (the often complex and usually incomplete mix of real systems in which businesses are run), not computer languages. Thus, disparate applications can be linked without custom programming.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
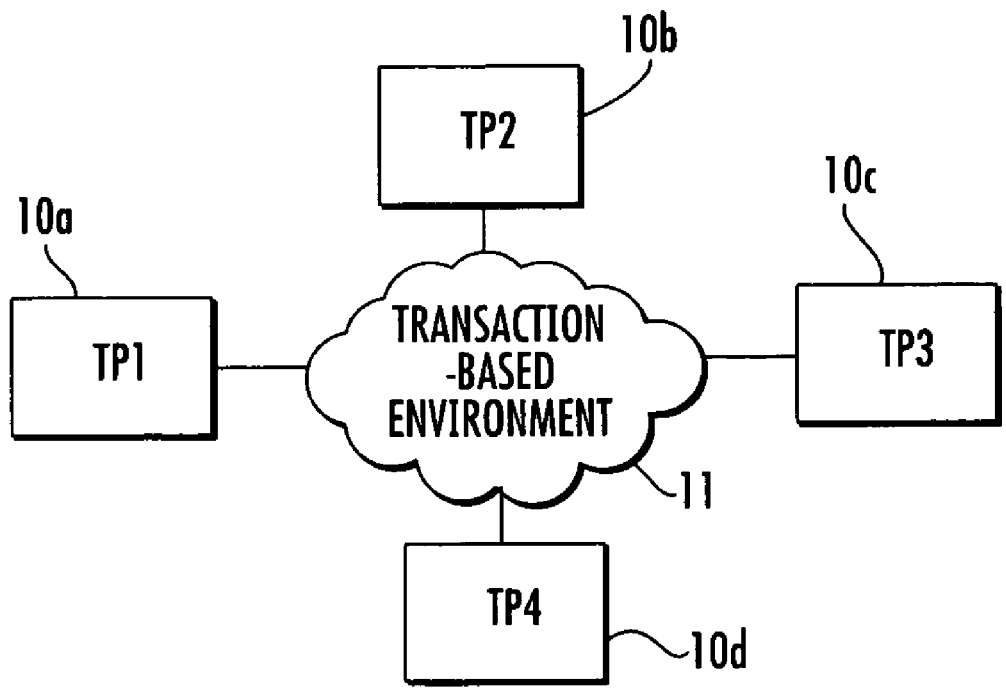
FIG. 1 is a block diagram of a plurality of disparate computers interconnected according to the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the invention, which broader aspects are embodied in the exemplary constructions.

FIG. 1 is a diagrammatic representation illustrating the manner in which various "trading partners" may be interconnected in accordance with the present invention. Specifically, a total of four trading partners 10a-d (also referred to as TP1-TP4) communicate with one another via a "transaction-based environment" 11 by which messages are directed according to the transaction to be performed. This is in contrast to many systems of the prior art which have relied on specific message routing from one computer to another.

Figure 2:
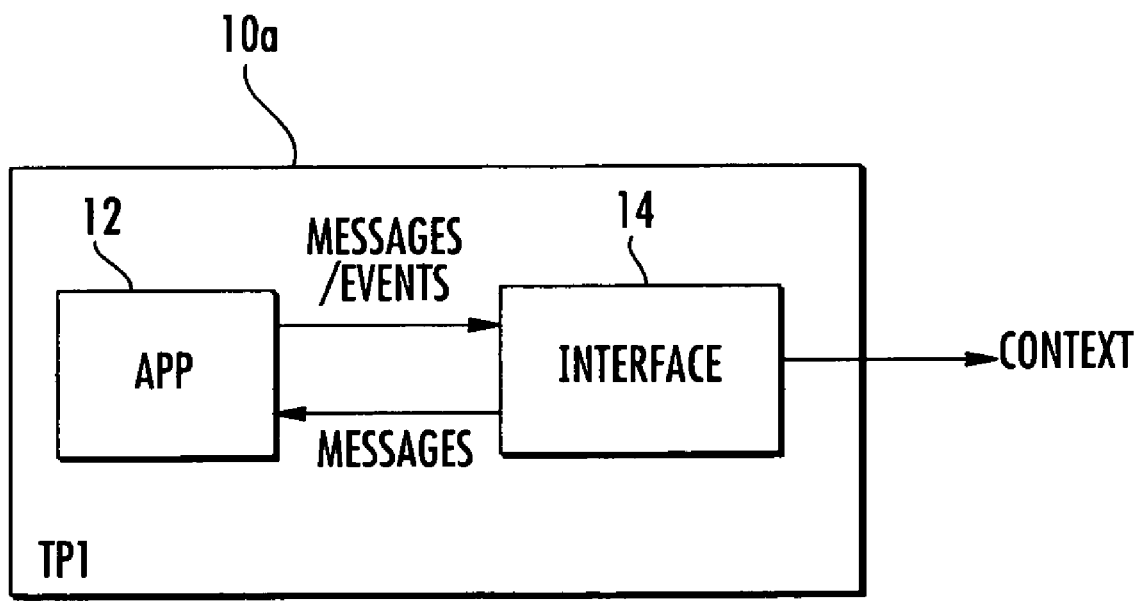
FIG. 2 is a block diagram showing more detail regarding one of the computers of FIG. 1.

Further details of the transaction partners can be discerned from FIG. 2, which illustrates transaction partner TP1 for purposes of illustration. In this case, a computer running an application 12 has also been loaded with "agents" and "configuration objects" to be explained more fully below. As a result, an interface 14 exists on the computer for the purposes of communicating with other trading partners. Messages (including events) sent by application 12 are converted by interface 14 into a "context" which dictates the action to be taken.

It is useful at this point to described in detail the agents that may be utilized in a system of the present invention, as well as the objects which model the topography of an enterprise in which the system is employed.

I. Agents

Any number of "agents" may be running on any number of computers supporting a distributed application according to the present invention. Agents may be implemented as "processes" or "tasks," depending on the operating system of the individual computer.

Agents running on a given computer communicate with each other using message queues, implemented according to the facilities provided by the operating system. By default, message queues are implemented in memory. The queues to certain types of agents can be configured to be disk queues, freeing the application from limitations on the number of outstanding messages and their retention across computer restarts.

Each computer which supports these agents normally has a local copy of the configuration (i.e., the collection of "configuration objects"). Agents typically 10ad configuration records into shared memory regions as they are referenced, so that subsequent references to those records are efficient.

Figure 3:
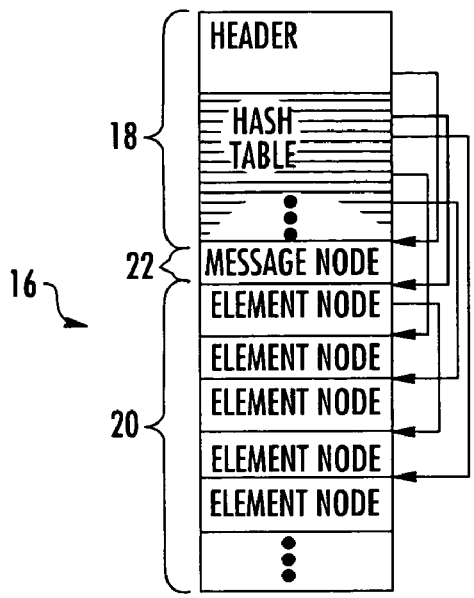
FIG. 3 is a diagrammatic representation of a "context" which may be generated during use of the system shown in FIG. 1.

Each agent, as it handles transactions and applications, holds current Element values in a data structure referred to as "context." As shown in FIG. 3, context 16 may be configured having a header 18, followed by a sequence of element value nodes 20, each of which identify the Element whose value is stored using its object identifier, the size of the value stored, and the value itself.

Additionally, message nodes and address nodes (e.g., message nodes 22) may appear among the element value nodes. These are similar to the element value nodes, except that they contain the text of messages or address info added and/or used by network agents and related verbs.

To facilitate efficient lookup, header 18 contains a hash-table of pointers to element value nodes. So that more than one Element can be added to context 16 with the same hash-value, element value nodes 20 may contain a pointer to the next node with the same hash value.

Additional header fields include the object identifier of the current Transaction (if one has been selected), a unique transaction identifier, sending and destination agent object identifiers, and sending and destination system object identifiers.

Figure 4:
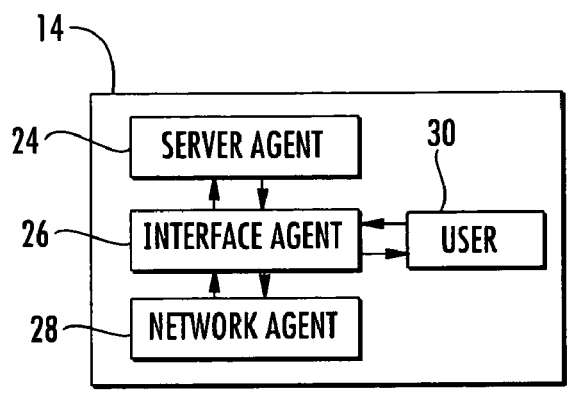
FIG. 4 is a diagram showing various agents that may be used in a system of the present invention.

As shown in FIG. 4, the agents in a particular application may include server agents 24, interface agents 26, network agents 28 and user login agents 30.

Figure 5:
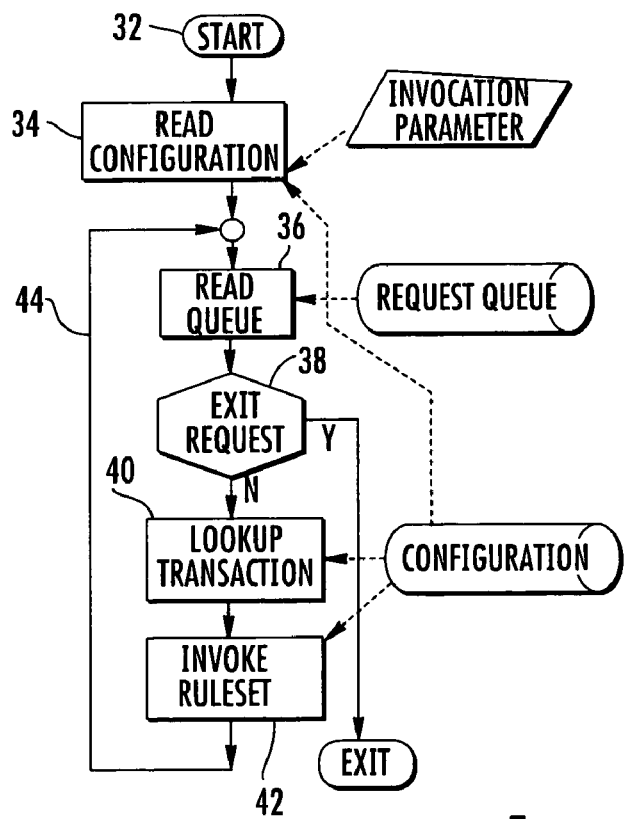
FIG. 5 is a flow chart showing operation of a server agent.

Referring now to FIG. 5, a server agent processes requests for transaction services. When a server agent is started on a particular computer (as indicated at 32), it reads its configuration object (as indicated at 34) to determine whether it should read requests from a memory-resident message queue or a disk queue. It then waits (as indicated at 36) to receive request messages from the queue.

A transaction service request is identified as a transaction request or a transaction advice. The agent sending a transaction request expects a response. The agent sending a transaction advice does not expect a response. Other possible request message types include administrative requests, such as shut-down (as indicated at 38).

Multiple server agents may be started for a particular server configuration object. In this case, all agents wait for requests on a common queue. This allows multiple requests to he handled simultaneously. During the course of processing a request, a server agent may need to make a request of some other agent. In this case, the server agent waits for the response to its request on an agent-specific (i.e. process- or task-specific) message queue.

Upon receipt of a transaction request or advice, the server agent makes the transaction context contained in the message the current transaction context. It then looks up the configuration object associated with the transaction object identifier contained in the message (as indicated at 40), and invokes the associated ruleset (as indicated at 42). In addition to other actions, such as data table access/modifications and requests of other agents, the ruleset typically makes changes to the transaction context. It is the resulting context that is returned to the requesting agent. Once the ruleset is complete, the agent's local copy of the context is discarded, and the agent returns to its request queue for the next request message (as indicated at 44).

Figure 6:
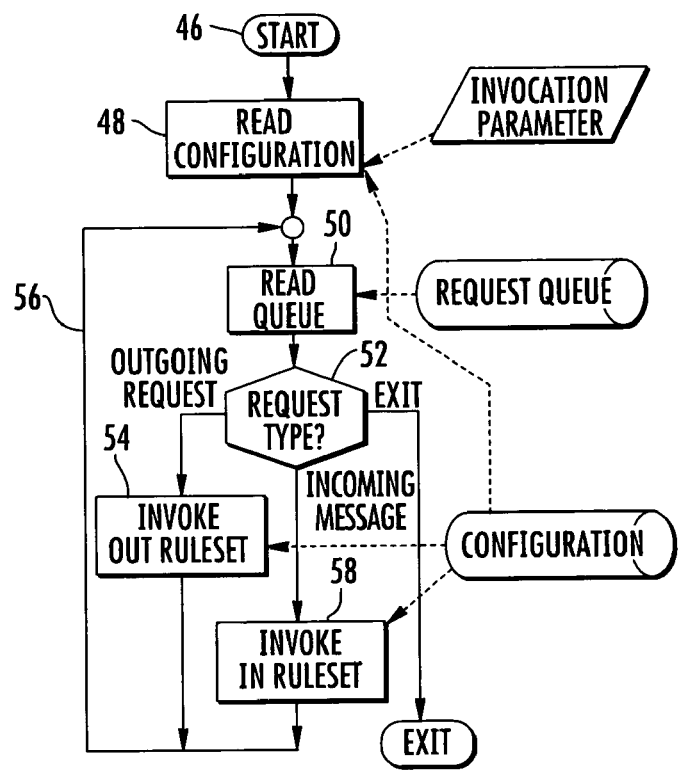
FIG. 6 is a flow chart showing operation of an interface agent.

Referring now to FIG. 6, an interface agent translates between a stream of messages to and from some external entity into a set of transaction requests and responses. When an interface agent is started on a particular computer (as indicated at 46), it reads its configuration object to determine whether it should read requests from a memory-resident message queue or a disk queue (as indicated at 48). It then waits to receive request messages from the queue (as indicated at 50).

A request message sent to an interface agent may be an incoming message from an associated network agent, or a transaction request/advice or response from some other agent (e.g., Server, User Login, or other Interface).

An incoming message from a network agent comprises a context containing message and possibly address nodes. In place of a transaction object identifier, the context contains a reserved token identifying it as an incoming message (identification indicated at 52).

Upon receipt of an outgoing transaction request/advice or response context, the interface agent makes the received context the current context. It then invokes its out ruleset (as indicated at 54), which may compose and send outgoing message requests to a network agent, invoke additional transactions, or initiate a transaction response. Once the ruleset is complete, the agent returns to waiting for messages from its queue (as indicated at 56).

Upon receipt of an incoming message context from a network agent, the interface agent invokes its in ruleset (as indicated at 58). The in ruleset may examine the text of the message received, invoke transactions, or restore a previously pended transaction context and initiate a response. Once the ruleset is complete, the agent returns to waiting for messages from its queue (as indicated at 56).

A network agent handles the protocol by which communications with an external entity are implemented, converting a sequence of events and associated timings into a stream of incoming and outgoing messages. When a network agent is started on a particular computer, it reads its configuration object to determine whether it should read requests from a memory-resident message queue or a disk queue, and to discover the details of its particular communications protocol (it also reads its associated protocol configuration object). It then waits to receive request messages from the queue, while it handles communications with the external entity.

Upon receipt of an outgoing message request from its associated interface agent, the network agent sends, or queues to send as soon as possible, the associated message to the external entity. Upon receipt of an incoming message from an external entity, the network agent composes a context containing the text of the received message and sends the context to its associated interface agent.

Figure 7:
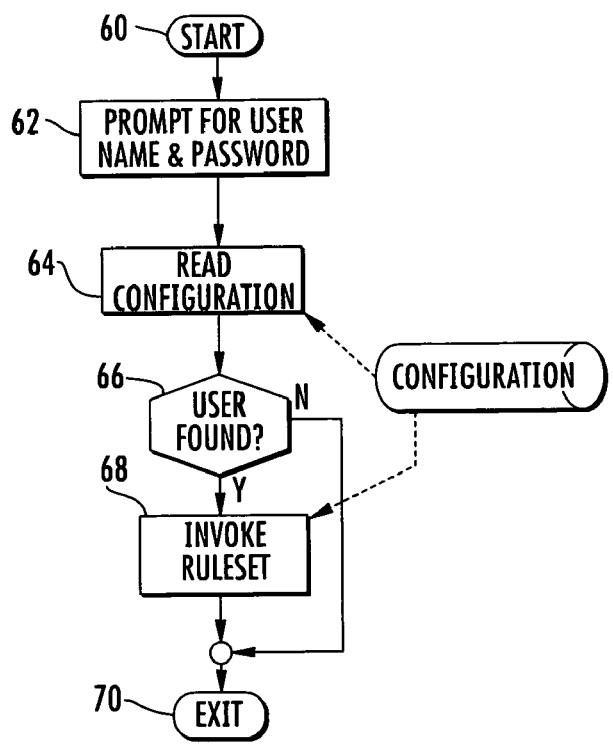
FIG. 7 is a flow chart showing operation of a user login agent.

Referring now to FIG. 7, a user login (aka screen) agent handles application presentation services, including full-screen presentation and capture of data, and full-screen user access to application functionality. Upon invocation (as indicated at 60), a user login agent prompts the user for username and password (as indicated at 62). The user login agent then reads its configuration object (as indicated at 64). If a user configuration object corresponding to the entered username is found (as indicated at 66), and the entered password matches the associated password information, the associated ruleset is invoked (as indicated at 68). The Ruleset may use a variety of verbs to invoke menus, listings and data-entry screens identified by Screen configuration objects. If a user is not found, the agent exits (as indicated at 70).

II. Configuration

Figure 8:
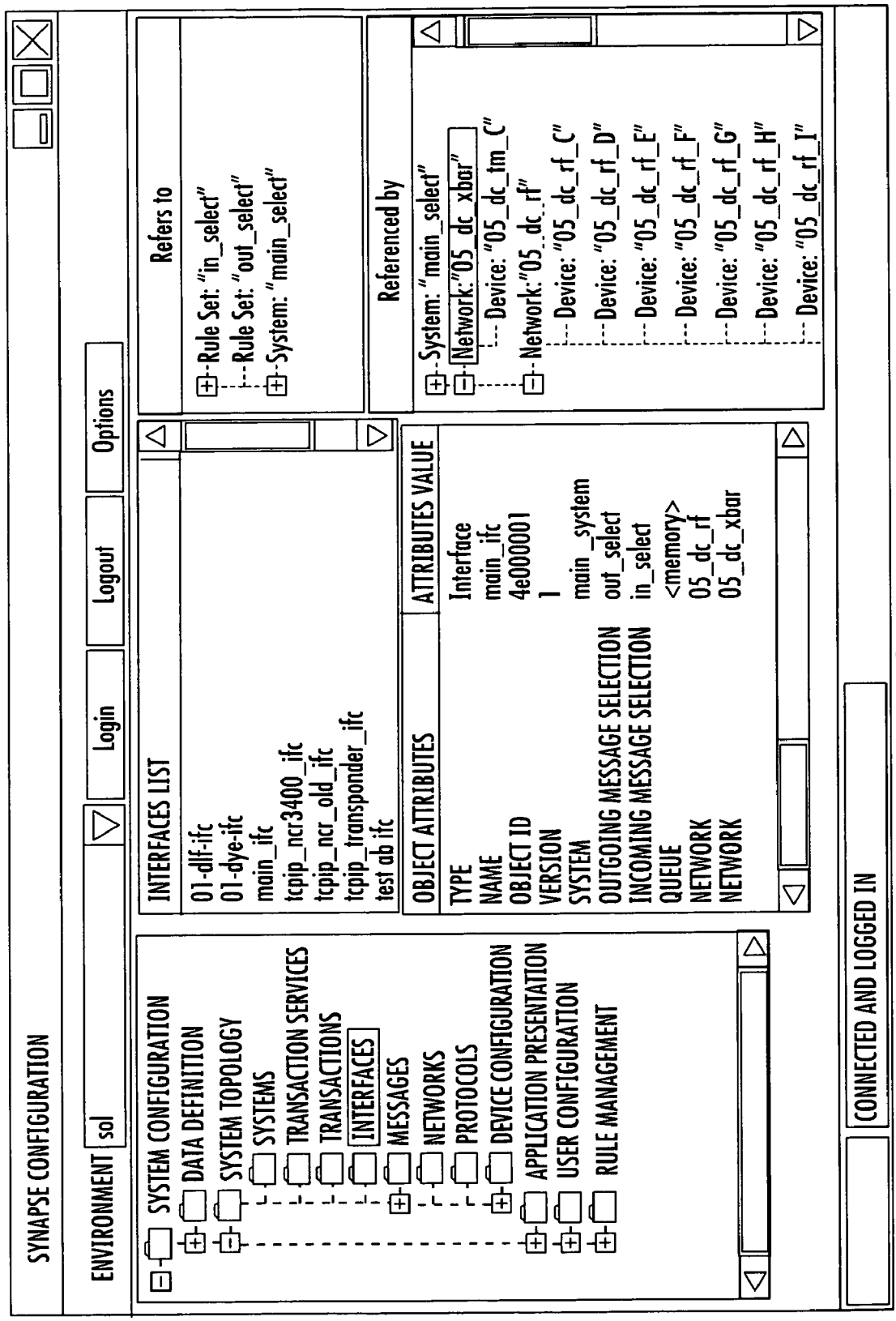
FIG. 8 is an exemplary configuration set up screen display.

Users configuring an application according to the present invention will be presented a series of screens, such as that shown in FIG. 8, that describe different and independent aspects of the particular computing environment. The resulting "configuration objects" are stored on disk as a set of records of varying length in a file with associated indexes. At run-time, configuration objects are read as they are referenced into memory regions which are shared among executing agent processes, including server agents (transaction service agents), interface agents, network agents and user login agents (i.e., screen agents).

Each configuration object has an object type, an object id, an object name, and an object version. Users configuring an application may generally refer to objects by their object type and object name, which uniquely identify them. Object type and object id also uniquely identify a configuration object. The object id may be arbitrarily assigned when a configuration object is created. Object type and object id are generally used internally by the system to store relationships among configuration objects and values of objects at run-time. The combination of object type and id is often referred to here as an object identifier.

Figure 9:
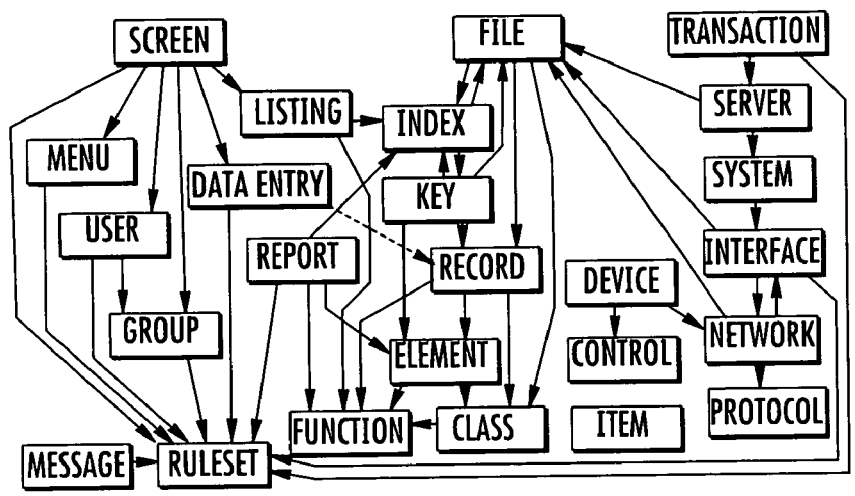
FIG. 9 is a diagram showing an exemplary referential relationship among preferred configuration objects.

The referential relationships among configuration objects is shown in FIG. 9. With this as a backdrop, various configuration objects will now be described.

(1) Class (Data Dictionary Object)

Class configuration objects identify data types and associated default values. Classes are generally used as attributes of other objects, such as Data Elements.

| Attribute | Description |
| --- | --- |
| Data Type | Identifies the structure of data. Possible values may include binary integer (1, 2, 4, or 8 bytes), binary floating point (4 or 8 bytes) character (fixed-length, null-terminated, or leading length byte/word; character set ASCII or EBCDIC; bit string (fixed-length or leading length byte/word), packed decimal (signed or unsigned; fixed length or leading length byte), or object identifier. |

-continued

| Attribute | Description |
| --- | --- |
| Extent1 | Specifies the length of data. For variable-length Data Types, specifies the maximum number of characters, digits or hits. For binary Data Types, specifies the number of significant digits (precision). |
| Extent2 | For floating point Data Types, specifies the number of decimal places to display. |
| Default Label | The label to use when displaying or prompting for data. |
| Default Headers | (2) The headers to use when displaying columns of data. |
| Default Description | A description to use when displaying or prompting for data (the default help text). |
| Default Value | The object identifier of a Function which determines a default value for the data when no explicit value has been set. |
| Default | The object identifier of a Function which determines whether or not the value set for the data is valid (as defined by the application). |

(2) Element (Data Dictionary object)

Element configuration objects identify atomic units of data which may have a value in the context of a transaction, or which may represent fields in records, in messages, of on data-entry screens.

| Attribute | Description |
| --- | --- |
| Class | The object identifier of a Class which describes the format of the data. |
| Label | The label to use when displaying or prompting for data; if not specified, inherited from the Class. |
| Headers | (2) The headers to use when displaying columns of data; if not specified, inherited from the Data Class. |
| Description | A description to use when displaying or prompting for data (the default help text); if not specified, inherited from the Class. |
| Default Value | The object identifier of a Function which determines a default value for the element when no explicit value has been set; if not specified, inherited from the Class. |

(3) Item (Data Dictionary object)

Item configuration objects identify atomic units of data which may have a system-wide value on the current System. Because the value of an Item is held in configuration, all agents active on a given system see the value assigned to the Item most recently by any agent.

| Attribute | Description |
| --- | --- |
| Data Type | Identifies the structure of data. Possible values may include binary integer (1, 2, 4, or 8 bytes), binary floating point (4 or 8 bytes), character (fixed-length, null-terminated, or leading length |

| Attribute | Description |
|---|---|
| | byte/word; character set ASCII or EBCDIC), bit string (fixed-length or leading length byte/word), packed decimal (signed or unsigned; fixed length or leading length byte), or object identifier. |
| Extent1 | Specifies the length of data. For variable-length Data Types, specifies the maximum number of characters, digits or bits. For binary Data Types, specifies the number of significant digits (precision). |
| Extent2 | For floating point Data Types, specifies the number of decimal places to display. |
| Dimension | Identifies the number values which may be set. If greater than one, the Item may be thought of as an array. |
| Value | The value returned when this Item is referenced. |

(4) Record (Data Dictionary Object)

Record configuration objects identify arrangements of fields, which may be Elements or sub-Records. These arrangements may be positional, in which the fields and the order in which they appear is pre-determined; bit-mapped, in which case certain fields appear in the record only if an associated controlling bit is set; or tagged, in which case fields may appear in any order, and are identified by a preceding unique tag (possibly with an associated field length indicator).

| Attribute | Description |
|---|---|
| Type | Identifies the type of field arrangement. Possible values include positional, bit-mapped, and tagged (tag before length, length before tag, or tag only). |
| Tag Class | The object identifier of a Class which specifies the structure of field tags (if Type is tagged). The object identifier of a Class which specifies the structure of field length indicators (if Type is tagged). |
| Fields | Identifies the fields which may appear in the record. Each entry in Fields has the following attributes: |
| Object Identifier | The object identifier of an Element or Record which describes this field. |
| Dimension | Identifies the number times this field is repeated at this position (i.e., the field is an array of values). The array dimension may depend on the value of another field in the record, in which ease Dimension is negative and its absolute value represents which entry in Fields specifies the array dimension. |
| Optional | (flag) If set, indicates that the field need not appear in every instance of the Record. |
| Bit-Mapped | (flag) If set, indicates that the field's existence in any instance of the record depends on the value of a bit in a bit-map. |
| Existence Depends | (flag) If set, indicates that the field's existence in any instance of the record depends on the value returned by the Function identified by the Exists attribute. |
| Length Depends | (flag) If set, indicates that the field's length in any instance of the record depends on the value returned by the Function identified by the Length attribute. |
| Terminated | (flag) If set, indicates that the field's length varies (up to its maximum length), in that the end of the field is marked by one of a set of Terminators. |
| Escaped | (flag) If set, and Terminated is set, indicates that Terminators may be included the field data if preceded by an Escape character. |
| Parent Bit-map | The Object Identifier of the field which acts as the bit map containing the bit which controls the existence of this field (if Bit-Mapped is set). |
| Parent Occurrence | More than one field may have the Parent Bitmap's Object Identifier. If the intended Parent Bit-map is not the first of these, this indicates which one it is (if Bit-Mapped is set). |
| Bit-map Format | Identifies how the Parent Bit-map is to be interpreted. Possible values include binary encoded, character encoded (a string of "0" and "1" characters), and hexadecimal encoded. |
| Bit-map Position | Identifies which bit in the Parent Bit-map controls the existence of this field (if Bit-Mapped is set). |
| Tag Value | The particular tag value that identifies this field (if Type is tagged). When this value is encountered in the record, the field is assumed to follow (possibly following with an associated length indication). |
| Terminators | A set of characters, any of which indicate the end of this field when they appear (if Terminated is set). |
| Escape | A character which, when it appears in the field data, indicates that the character which follows it is to be treated as field data (if Terminated and Escaped are set). |
| Exists | The object identifier of a Function which when evaluated (as a particular instance of a Record is being analyzed) determines whether or not this field appears in the record (if Existence Depends is set). |
| Length | The object identifier of a Function which when evaluated (as a particular instance of a Record is being analyzed) determines the length of this field as it appears in the record (if Length Depends is set). |

(5) File (Data Dictionary Object)

File (or Table) configuration objects identify long term storage (typically on disk) for data records.

| Attribute | Description |
|---|---|
| Organization | Specifies how the data is stored. Possible values include (but are not limited to) Fixed (records are of a specified length in a operating-system native flat file), Varying (vfile format, in which all records have a leading and trailing length word, the trailing length word falling on the nearest even byte boundary; deleted records are identified by a negative record length), or Queue (internal format for holding messages destined for a particular agent). |
| Record Definition | The object identifier of a Record which describes the format of records in the File. |
| System | The object identifier of a System which identifies the location of the file in a distributed system. If not set, an instance of the File can exist on each System. |
| Data Path | The operating-system and Organization dependent path which locates the data. This may specify, for example, a directory and file name, and may be relative. |
| Open Mode | The way in which multiple agent processes coordinate access to the data in the File. Possible values may include record locking, and exclusive. |
| Deleted Record Index | The object identifier of an Index by which areas of the data from which records have been deleted may be located. |
| Indexes | A list of object identifiers, each identifying an Index by which records may be located and sorted. |

(6) Index (Data Dictionary Object)

Key configuration objects are used to sort records in Files (Tables).

| Attribute | Description |
|---|---|
| File | The object identifier of the associated File (Table). |
| Data Path | The operating-system and File Organization dependent path which locates the indexing data. This may specify, for example, a directory and file name, and may be relative. |
| Collation | Determines sort order. Possible values include ascending or descending ASCII, Alphabetic or numeric. |
| Key Definitions | A list of object identifiers, each identifying a Key that specifies what record-associated data is assembled to create entries in the index. Since more than one Key may be specified, records may have multiple index entries. |

(7) Key (Data Dictionary Object)

Index configuration objects specify what record-associated data is assembled to create entries in an associated Index.

| Attribute | Description |
|---|---|
| File (Table) | The object identifier of the associated File (Table). |
| Mode | Indicates whether entries in the Index are created for records which are missing some or all of the values from which Components are resolved. |
| Index | The object identifier of the associated Index. |
| Components | Each component entry identifies Elements in the Record from which data is to be taken to form an entry in the Index. These data are concatenated to form the entry. |
| Element | The object identifier of the element from which the component is taken. This is fully qualified, as necessary, with the object identifiers of any sub-Records in which the Element appears, and, in the case of arrays (of the Element and/or any sub-Record) the desired array instance(s). |
| Offset | If set, identifies the first byte of the Element value to be used. |
| Length | If set, identifies the number of bytes of the Element value to be used. Note that Offset and Length might be thought of as a sub-string of the value. |

(8) System (System Topology Object)

System configuration objects identify the locations where transaction handling agents or resources reside. A "system" may represent a particular software application, a computer, a group of computers, a communications network, or other equipment with which a distributed implementation of the present architecture may communicate and which offers transaction services. Systems on which the present architecture is installed and which support one or more transaction-handling agents which share the current configuration are referred to as "internal" to the distributed implementation. Others may be referred to as "external." It is possible for a single computer to house multiple Systems (both internal and external) simultaneously. Note that it is not necessary to identify as Systems those applications, computers, networks or equipment which only originate Transactions (i.e., which offer no transaction services).

| Attribute | Description |
|---|---|
| Interface ID | The object identifier of an Interface through which to communicate with the System. Does not need to be specified for "internal" systems. |

(9) Server (System Topology Object)

Server (transaction service) configuration objects identify entities which process transactions. Servers are "internal" if their associated System is "internal," and "external" otherwise.

| Attribute | Description |
| --- | --- |
| System | The object identifier of the System on which the Server agent executes. |
| Queue | The object identifier of a File that holds requests destined for the Server agent. If not set, requests are held in memory. Does not need to be specified if the System attribute specified is "external". |

(10) Transaction (System Topology Object)

Transaction configuration objects identify atomic units of work in an application implemented according to the invention.

| Attribute | Description |
| --- | --- |
| Ruleset | The object identifier of a Ruleset that specifies how the Transaction is to be processed. Does not need to be specified if all of the Servers specified are "external". |
| Servers | A list of object identifiers identifying the Servers which are capable of processing the Transaction. |

(11) Interface (System Topology Object)

Interface configuration objects identify agents which handle the flow of transactions to and from external applications, computers, communications networks or other equipment.

| Attribute | Description |
| --- | --- |
| System | The object identifier of the System on which the interface agent executes. |
| Queue | The object identifier of a Pile that holds requests destined for the interface agent. If not set, requests are held in memory. |
| In Ruleset | The object identifier of a Ruleset which specifies how to interpret incoming messages or events. This ruleset may specify the interpretation rules completely, or may select an In Message which specifies additional interpretation rules. |
| Out Ruleset | The object identifier of a Ruleset which specifies how to construct outgoing messages or events. This ruleset may specify the construction rules completely, or may select an Out Message which specifies additional construction rules. |
| Networks | A list of object identifiers identifying the Networks which handle messages passing to and from the external applications, computers, communications networks or other equipment. |

(12) In Message, Out Message (System Topology Object)

In Message and Out Message configuration objects identify additional message processing rules to be invoked by interfaces. For example, the In Ruleset for a given Interface may have rules which identify categories of messages, and select appropriate In Message types for detailed analysis depending on the category. Note that this is most useful for interfaces that must handle complex sets of messages.

| Attribute | Description |
| --- | --- |
| Ruleset | The object identifier of a Ruleset that specifies how the message is to be processed (analyzed or constructed). |

(13) Network (System Topology Object)

Network configuration objects identify agents which handle messages and/or event notifications to and from external applications, computers, communications networks or other equipment.

| Attribute | Description |
| --- | --- |
| System | The object identifier of the System on which the Network agent executes. |
| Queue | The object identifier of a File that holds requests destined for the Network agent. If not set, requests are held in memory. |
| Interface | The object identifier of the Interface to which the Network agent sends incoming messages, and from which it receives outgoing messages. |
| Type | Identifies the type of external application, computer, communications network or other equipment with which to communicate (e.g. generic, Intermec) |
| Protocol | The object identifier of a Protocol object which specifies protocol type and parameters necessary for communication with the external application, computer, communications network or other equipment. |
| Type | Identifies the type of external application, computer, communications network or other equipment with which to communicate (e.g. generic, Intermec) |
| Network Info | Identifies any additional, Network Type-specific communications parameters. |

(14) Protocol (System Topology Object)

Protocol configuration objects identify communications protocol parameters nessary for communications which external applications, computers, communications networks or other equipment.

| Attribute | Description |
| --- | --- |
| Type | The type of communications protocol to use. Possible values include (but are not limited to) async, bisync, TCP/IP (client or server), UDP, X25 (PVC or SVC), LU2, LU6.2, etc. |

Additional attributes vary depending on the Type selected. For example, async attributes include Baud Rate, Character Size, Stop Bits, Parity, Flow Control, and Record Demarcation (which includes record length if records are of a fixed length, or the end-of-record character otherwise). Similarly, TCP/IP Client attributes include Destination Host Name, Service Name, and Record Demarcation.

(15) Device (System Topology Object)

Device configuration objects identify external devices that the application would like to manage. The application can send explicit messages to Devices (e.g. "print" commands to a label printer). Additionally, the system can manage the download of configuration data (e.g. form definitions, programs, etc.) to Devices.

| Attribute | Description |
| --- | --- |
| Type | The type of Device (e.g. Intermec label printer). |
| Address | Device address information by which messages to/from the Device are routed/identified. |
| Network | The object identifier of the Network which handles communications with the Device. |
| Control Entries | Names which identify configuration data (formats, programs, etc.) currently downloaded to the Device. The names are Type specific, but normally those of Control objects which further specify what configuration data is downloaded. |

(16) Control (System Topology Object)

Control configuration objects identify configuration data that may be downloaded to Devices (e.g. form definitions, programs, etc.), or additional Network-specific configuration (e.g. data-point definitions).

| Attribute | Description |
| --- | --- |
| Type | The type of Device (e.g. Intermec label printer). |
| Buffer Type | Specifies bow Buffer is to be interpreted. Possible values include (but are not limited to) Direct (Buffer contains literal download data), Indirect (Buffer contains the pathname of a file which contains the download data), or Data Point (Buffer contains a list of data point definitions). |
| Buffer | Contains control information (as specified by Buffer Type). |

(17) Screen (Application Presentation Object)

Screen configuration objects identify application presentation screens, used for user input and/or display of data.

| Attribute | Description |
| --- | --- |
| Detail Object | The object identifier of a Menu, Listing, or Data Entry that specifies the details of the data presentation. |
| Title | Text which may appear as a screen title. |
| Actions | A list of object identifiers of Rulesets which can be invoked at the request of the user when the Screen is active, via associated function key or button. Each Action has an associated label that should describe the function implemented by the Ruleset. |
| Access Control | A list of entries controlling who may use this Screen, and which of the Actions they are allowed. Each entry has the following attributes: |
| User or Group | The object identifier of a User or Group for which access is being specified. The system first checks for an entry for the current user; if none exists, the system checks for an entry for the current user's group. |
| Access Type | Allowed or disallowed. The disallowed value is useful for excluding a particular member of a group while still allowing access for the group. |
| Allowed Actions | Indicates which of the Actions may be invoked by the user or group. |

(18) Menu (Application Presentation Object)

Menu configuration objects identify application presentation menus. When a Screen which refers to a Menu is invoked, a list of selections from which the user may select is displayed.

| Attribute | Description |
| --- | --- |
| Selections | A list of entries that determines what actions are available from the Menu. Each entry has the following attributes: |
| Action | The object identifier of a Ruleset which can be invoked at the request of the user when the Menu is active, via associated key-press or button. |
| Label | Text which should describe the function implemented by the Ruleset. One of the letters of the Label may be identified as a "hot key," in which case it will appear underlined (or otherwise highlighted) to indicate that this selection may be made by pressing the associated letter key. |

(19) Listing (Application Presentation Object)

Listing configuration objects identify application presentation listings. When a Screen which refers to a Listing is invoked, a list is displayed which is constructed from a specified set of records in a table.

| Attribute | Description |
| --- | --- |
| Index | The object identifier of an Index which determines the File from which records are selected, and the order in which they appear. |
| Record Determination | The object identifier of a Record which determines how the records are to be interpreted. By default, the Record Definition attribute of the associated File is used. |
| First Key | The object identifier of a Function which, when evaluated, determines the value of key of the first record to be displayed in the list. |

| Attribute | Description |
| --- | --- |
| Last Key | The object identifier of a Function which, when evaluated, determines the value of key of the last record to be displayed in the list. |
| Filter | The object identifier of a Function which, when evaluated for each record, determines whether or not the record is to be included in the list. |
| Display | The object identifier of a Function which, when evaluated for each record, determines the text to be displayed list. |

(20) Data Entry (Application Presentation Object)

Data Entry configuration objects identify data entry screens. When a Screen which refers to a Data Entry is invoked, a specified arrangement of fields is displayed. Some or all of the fields may be edited by the user, as allowed by the configuration.

| Attribute | Description |
| --- | --- |
| Record | The object identifier of a Record which determines the set of fields which are to appear on the screen. |
| Fields | A set of entries which determines how each of the Elements in the Record are to be displayed. Each entry has the following attributes: |
| Label Location | The column and row at which the field label is to be displayed. |
| Label Length | The number of characters of field label to display. |
| Label Display Modes | Display attributes of the label (e.g. underlined, hold, dim, etc.) |
| Field Locations | The column and row at which the field is to be displayed. |
| Field Length | The number of characters of field to display. |
| Field Display Modes | Display attributes of the field (e.g., underlined bold, dim, etc.) |
| Field Control Modes | Controls how data is entered (e.g., normal, output-only, select-only, etc). |
| Detail Ruleset | The object identifier of a Ruleset which is invoked when the user requests details about this field. This Ruleset can implement any application functionality, but typically allows selection of a value for the field. |

(21) Report (Application Presentation Object)

Report configuration objects identify reports which may be displayed or printed. A Report consists of optional title and header lines, primary lines composed of a set of columns, and alternate lines of arbitrary text that may be interspersed with the primary lines.

| Attribute | Description |
| --- | --- |
| Index | The object identifier of an Index which determines the File from which records are selected, and the order in which they appear. |
| First Key | The object identifier of a Function which, when evaluated, determines the value of key of the first record from which to generate report lines. |
| Last Key | The object identifier of a Function which, when evaluated, determines the value of key of the last record from which to generate report lines. |
| Report Format | Identifies the format of the report (e.g., standard, free-format, form, etc.) |
| Title Lines | The object identifiers of Functions which, when evaluated, determine the text to appear in the report titles (at the top of each page in a standard format report). |
| Header Fields | The object identifiers of Functions which, when evaluated, determine the text to appear in the report headers (typically on each page before column headers, and primary and alternate report lines, although, in the ease of form reports, Header Field values may appear anywhere on the form). Each Header Field also has associated formatting information, such as indent, width and justification. |
| Page Breaks | The object identifiers of Functions which, when evaluated after reading a record, determine whether to insert a page break before generating any additional primary or alternate lines. |
| Pre-Processing | The object identifier of a Ruleset which is evaluated after reading each record and before any additional processing is done. |
| Post-Processing | The object identifier of a Ruleset which is evaluated before reading the next record, after all processing for the current record is complete. |
| Filter | The object identifier of a Function which is evaluated after reading each record and performing the Pre-Processing and which determines whether primary lines are generated (or Slave processing occurs) for the record. |
| Slave | The object identifier of a Report controls report formatting. For each record read as specified in the current Report, a complete set of records is processed as defined by the Slave Report configuration. |
| Alternate Lines | Entries which control arbitrary text lines which may appear on the report. Each entry has the following attributes: |
| Filter | The object identifier of a Function which is evaluated for each record to determine whether this Alternate Line is to be generated. |
| Contents | The object identifier of a Function which, when evaluated, determines the text to appear. |
| Explode | The object identifier of a Ruleset which can be invoked when the Alternate Line text is selected by a user who is viewing the report online. |
| Format | Text width, indent and justification. |
| Location | Whether the Alternate Line is to be generated before or after the primary line, and/or at the end of the report. |

| Attribute | Description |
| --- | --- |
| Primary Line Format | Includes: number of column headers and footers; whether to suppress column headers and footers on pages on which no primary line appears; whether or not footers "float" (appear immediately after the last detail line) or are fixed at the bottom of each page. |
| Primary Line Explode | The object identifier of a Ruleset which can be invoked when the primary line is selected by a user who is viewing the report on-line. |
| Primary Line Columns | Entries which control primary text lines appearing on the report. Each entry controls a column of output and has the following attributes: |
| Contents | The object identifier of a Function or Element which, when evaluated, determines the text to appear in the column. |
| Format | Column width, indent and justification. |
| Headers | The object identifiers of a Function which, when evaluated, determine the text to appear at the top of the column on each page. Each of the Headers has associated formatting information, including justification. |
| Footers | The object identifiers of a Function which, when evaluated, determine the text to appear at the bottom of the column on each page. Each of the Footers has associated formatting information, including justification. |

(22) User (User Access Object)

User configuration objects identify users who may access applications via application presentation objects.

| Attribute | Description |
| --- | --- |
| Group Name | The Group to which the User belongs. Password information against which to verify entered passwords. |
| Ruleset | The object identifier of a Ruleset which is invoked when the User logs in. If not set, the Ruleset for the Group is invoked. |

(23) Group (User Access Object)

Group configuration objects identify groups of users who may access applications via application presentation objects.

| Attribute | Description |
| --- | --- |
| Default Ruleset | The object identifier of a Ruleset which may be invoked when a User in this Group logs in. |

(24) Ruleset (Rule Management Object)

Ruleset configuration objects encode application-specific functionality. Rulesets are composed using a set of verbs to form rules. A rule is composed of an antecedent and a consequent. An antecedent is a conjunction of conditionals (constructed of verbs), evaluated one at a time. If the conditionals return a non-false value, the rule is said to be fired. A consequent is a list of statements (constructed of verbs) to be evaluated when the rule is fired. The first rule to be fired completes the invocation of the Ruleset, and none of its subsequent rules are evaluated.

The syntax is as follows:

```
Ruleset: = always: Stmt; [[Stmt;] . . . ]
Ruleset: = Rule [Rule . . . ] [DfltRule ]
Rule: =    if: Cond [[ & Cond] . . . ]
              then: Stmt; [[ Stmt; ] . . . ]]
DfltRule: =   otherwise: Stmt; [[ Stmt;] . . . ]
Cond: =    verb ([arg . . . ] )
Stmt: =    verb ([arg . . . ] )
Arg: =     verb ([arg . . . ] )
Arg: =     literal (test string, name or number)
```

(25) Function (Rule Management Object)

Function configuration objects encode application-specific functionality. When invoked, a Function returns a value. Functions are composed by nesting verbs.

The syntax is as follows:

```
Function: =   verb ([arg . . . ]);
Arg: =    verb ([arg . . . ])
Arg: =    literal (text string, name or number)
```

III. Example

Figure 10:
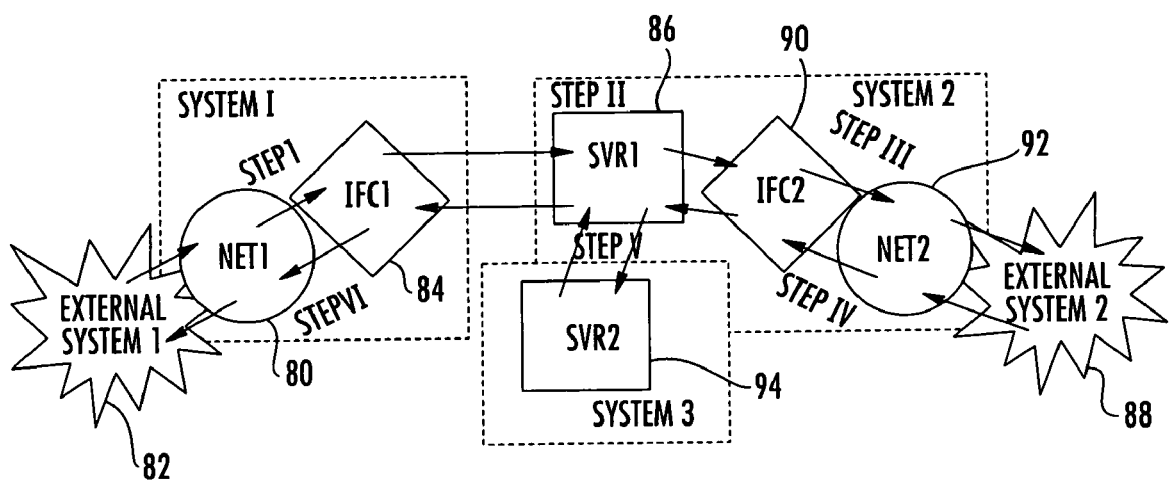
FIG. 10 is a further diagram of a system in accordance with the present invention by which a simplified example may be described.

With reference to FIG. 10, a hypothetical transaction can be followed through a system of the present invention. Imagine the transaction is a financial transaction that must check with an external system for verification. The result of the transaction will be sent back to the originating external system as a response.

STEP I Message Origination

Network agent NET1 (indicated at 80) using Protocol PROT1 reads in a message from its external system 82.

NET1 sends this message to its associated Interface agent IFC1 (indicated at 84).

IFC1 examines the message to determine what type of message it is. Using the appropriate record structure (REC1) as a map, it then binds the message into an initialized Context. This puts the message data into the various data Elements within Context, making the transaction context independent of the message layout.

IFC1 then sends the Context to the appropriate Server agent SVR1 (indicated at 86) for processing. Actually, the routing to the correct server takes place automatically within the system. This allows for busy servers to be alleviated during periods of heavy stress.

STEP II Initial Processing

SVR1 reads the Context and performs the desired Transaction TRN1.

TRN1 needs to request information from external system 2 (indicated at 88) about the information in Context.

STEP III Information Request

Context is sent to interface agent IFC2 (indicated at 90).

IFC2 builds a message from Context using REC2.

The message is sent to network agent NET2 (indicated at 92).

NET2 reads the message and transmits it to external system 2 using PROT2.

STEP IV Information Response

Some time later, NET2 reads a message in from external system 88.

NET2 sends the message to IFC2.

IFC2 identifies the message as the response to TRN1. It binds the message into the Context of TRN1 instead of an initialized Context. Thus, the response from the external system becomes part of our Context.

IFC2 sends the Context back to SVR1.

STEP V Secondary Processing

SVR1 uses the response information in additional processing.

TRN1 updates files with the initial result.

TRN1 sends Context to another server agent SVR2 (indicated at 94) for additional processing.

SVR2 reads the Context and performs TRN2.

TRN2 updates files with the results.

Context is sent back to the originating Interface IFC1 as a response. Thus, the transaction request has been fulfilled.

STEP VI Send Result

IFC1 builds a message from Context using REC3.

The message is sent to NET1.

NET1 reads the message and transmits it using PROT1.

While preferred embodiments of the present invention and preferred methods of practicing same have been shown and described, modifications and variations may be made by thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A method of performing transactions between disparate systems in a computing environment, said method comprising steps of:
    (a) receiving a first message in a first message format from an originating system, said message having request data indicative of a transaction request;
    (b) at a first interface, evaluating said first message to ascertain said request data;
    (c) said first interface further applying a predetermined criteria to said request data so as to generate a context data structure organizationally independent of said first message format, said context data structure containing a plurality of data elements indicative of said transaction request, wherein said context data structure further includes an object identifier that refers to a configuration object that is indicative of the transaction request;
    (d) routing said context data structure to an appropriate service system through use of configuration objects such that at least one predetermined ruleset is invoked so that said transaction request can be responsively fulfilled by acting upon said plurality of data elements of said context data structure according to said at least one predetermined ruleset, said configuration objects being modifiable independently of said at least one predetermined ruleset,
    wherein said configuration object corresponds to an associated predetermined ruleset of said at least one predetermined ruleset, and looking up said configuration object that is associated with the object identifier to invoke said associated predetermined ruleset; and
    wherein said configuration object further comprises an object type, an object id, an object name, and an object version, and at least one of said object type, said object id, said object name, and said object version is used to identify said configuration object;
    (e) fulfilling said transaction request at said service system and indicating the fulfilled said transaction request to said first interface; and
    (f) issuing via said first interface a second message to said originating system in said first message as a first response message to said transaction request.

2. The method as set forth in claim 1, wherein said first interface includes a network agent and an interface agent, said network agent being operative to extract said request data from said first message and said interface agent being operative to produce said transaction request therefrom.

3. The method as set forth in claim 2, wherein said service system includes a server agent in communication with said interface agent.

4. The method as set forth in claim 3, wherein said agents communicate with each other via message queues.

5. The method as set forth in claim 1, wherein said step of fulfilling said transaction request comprises:
    (g) at a second interface, issuing a third message in a second message format to an auxiliary system requesting information;
    (h) receiving a second response message at said second interface in said second message format containing said information; and
    (i) extracting said information from said second response message at said second interface and providing said information to said service system.

6. The method as set forth in claim 5, wherein said first message format and said second message format are different protocols.

7. The method as set forth in claim 5, wherein said first message format and said second message format are equivalent protocols.

* * * * *